United States Patent [19]

Guntersdorfer

[11] 3,904,896

[45] Sept. 9, 1975

[54] PIEZOELECTRIC OSCILLATOR SYSTEM

[75] Inventor: Max Guntersdorfer, Munich, Germany

[73] Assignee: Siemens Aktiengesellschaft, Berlin & Munich, Germany

[22] Filed: July 10, 1972

[21] Appl. No.: 269,935

Related U.S. Application Data

[63] Continuation-in-part of Ser. No. 158,472, June 30, 1971, abandoned.

[30] Foreign Application Priority Data

| | | |
|---|---|---|
| June 15, 1971 | Germany | 2129664 |
| June 30, 1970 | Germany | 2032433 |
| June 15, 1971 | Germany | 2129718 |

[52] U.S. Cl. .................... 310/8.1; 310/8.2; 310/8.3; 310/8.5; 331/116

[51] Int. Cl. .................... H01v 7/00

[58] Field of Search ............... 310/8.1, 8.2, 8.3, 8.5, 310/9.8, 26; 318/116

[56] References Cited

UNITED STATES PATENTS

| | | | |
|---|---|---|---|
| 2,825,186 | 3/1958 | Palush | 310/8.3 X |
| 3,328,610 | 6/1967 | Jacke et al. | 310/8.2 X |
| 3,524,082 | 8/1970 | Mettler | 310/8.1 |
| 3,657,579 | 4/1972 | Kramer | 310/8.1 |
| 3,657,874 | 4/1972 | Imahashi | 310/8.1 X |
| 3,735,159 | 5/1973 | Murry | 310/8.2 X |

*Primary Examiner*—Mark O. Budd

*Attorney, Agent, or Firm*—Hill, Gross, Simpson, Van Santen, Steadman, Chiara & Simpson

[57] ABSTRACT

A piezoelectric oscillator system includes a coupling oscillator having a piezoelectric transducer and a plate for vibration in a bending mode. The coupling oscillator is mechanically connected to a second plate which is also caused to vibrate in a bending mode upon energization of the piezoelectric transducer by an AC voltage. The second-mentioned plate may carry a second piezoelectric transducer for generating an electrical output signal. The system includes means for effecting self generation of the AC voltage through the provision of a tap electrode associated with the piezoelectric transducer for taking off a feedback control signal for a transistor switching circuit which may be constructed to provide an AC rectangular waveform.

12 Claims, 6 Drawing Figures

PIEZOELECTRIC OSCILLATOR SYSTEM

CROSS-REFERENCE TO RELATED APPLICATION

This application is a continuation-in-part of U.S. Ser. No. 158,472, filed June 30, 1971, now abandoned.

BACKGROUND OF THE INVENTION

1. Field of the Invention

This invention relates to a piezoelectric oscillator system for transformation of oscillatory amplitudes in response to the application of an AC voltage. The invention comprises a coupling oscillator which includes a piezoelectric transducer having a plate connected thereto, which plate is to be stimulated to bending vibrations, the plate being coupled to the coupling oscillator by means of a mechanical connection having a low cross-sectional area whereby the resonant frequency of the plate is synchronized with that of the coupling oscillator.

2. Description of the Prior Art

Magnetostrictively or piezoelectrically driven longitudinal oscillators have been employed in the art in order to generate ultrasonic oscillations having amplitudes which are as high as can practically be attained. These oscillators are generally so designed that a transformation of amplitude results, that is, the relatively low longitudinal oscillation amplitude of the piezoelectrically transducer is enlarged by an appropriately coupled mechanical oscillator system (VDI magazine, Volume 108 (1966), pages 1669–1716).

In order to drive such an ultrasonic oscillator with a piezoelectric ceramic system, it has been discovered that the following difficulties arise. The total oscillating quality of the system becomes low because of the low mechanical quality factor of the ceramic material, particularly for high amplitudes. Moreover, such an arrangement requires a very high electrical operating voltage because of the necessarily considerable thickness of the piezoelectric element of the system.

The use of a thinner drive element avoids the disadvantage of the high operating voltage per se. However, in order to obtain a high electromechanical coupling, the ceramic transducer must then be mounted at a location of high mechanical tension. However, this causes a disadvantageous influence to prevail in the form of a reduction in the quality of oscillation. In addition, the point of securement is then similarly located in an area of high mechanical tension and therefore exposed to extreme stress. A fastening of the transducer to the mechanical system by pasting (gluing) is therefore practically impossible in such a solution. The known adhesives certainly do not withstand the tensile forces occurring at increased output levels.

SUMMARY OF THE INVENTION

In view of the foregoing, it is therefore a primary object of the present invention to create a piezoelectric system which at low input has a relatively large oscillation amplitude and obviates the disadvantages of the embodiments heretofore known from the prior art.

The foregoing objective is realized, according to the present invention, through the provision of an oscillator system such as described above wherein a coupling oscillator is designed as a plate with the piezoelectric transducer fastened thereon and wherein the plate is stimulated with a piezoelectric transducer toward bending oscillations in response to the application of an AC voltage to electrodes of the transducer, whereby the bending frequency agrees, as a result of the selection of the diameter of the plate, with the bending frequency of the mechanically coupled plate.

An advantageous result of the invention resides in the fact that the piezoelectric transducer is operated in an operating range of small deflections and thus at high mechanical quality, that a low electrical voltage amplitude suffices for the operation of the transducer, that a high electro-mechanical coupling is provided and that at the point of connection between the transducer and the other mechanical system components, only shearing stresses are present. The ceramic attenuates the bending oscillator less than is the case with an identical coupling factor with a longitudinal oscillator known from the prior art.

Preferably the plate of the coupling oscillator, on which the piezoelectric transducer is fastened, coupling bridge and the second oscillating plate are provided as a single one-piece construction of metal.

The oscillating system according to the invention can be advantageously employed as a fluid atomizer. By applying a fluid to the second and smaller plate, the fluid is atomized at sufficient oscillation amplitude which is maximum at the edge of the plate and a running off of the fluid is prevented to a large extent.

According to a preferred embodiment of the invention, the plate on which the piezoelectric transducer is fastened and the coupling bridge are designed together as a frustum. This embodiment of the invention is particularly appropriate for technical applications because of its rugged design.

An oscillating system according to the invention can also be advantageously employed for building an electrical voltage transformer. Such a voltage transformer is characterized in that a second ceramic element is carried by the second plate, for example a plate of piezoelectric ceramic is fastened to the second plate, and the ceramic plate and the second plate are provided in a rectangular configuration in longitudinal section and so synchronized that at their resonant frequency bendings only occur in one of the marginal directions. The additional ceramic element may be provided with output electrodes and polarized so that an output voltage may be taken off from the electrodes.

Preferably, the additional ceramic element in which the output voltage is generated is polarized and two strip-like metal electrodes are mounted on the surface of the element which is opposite to the plate carrying the element for taking off the output voltage. The ceramic element is polarized in the direction between the electrodes.

It is also possible to tap off an output voltage which is a multiple of the input voltage.

Due to the fact that the piezoelectric transducer is operated according to the invention as a bending oscillator, the ceramic plates can advantageously be pasted (glued) to the mechanical vibrator system. Only shearing stresses act at the glue joints, which stresses are tolerated better by the adhesives than a tensile stress. The transducer stimulating the system is polarized in the direction of its thickness so that the electrical energy can easily be supplied and a high coupling can be achieved.

BRIEF DESCRIPTION OF THE DRAWINGS

Other objects, features and advantages of the invention, its organization, construction and operation, will best be understood from the following detailed description of a plurality of embodiments thereof taken in conjunction with the accompanying drawings, in which.

DESCRIPTION OF THE PREFERRED EMBODIMENTS

Figure 1:
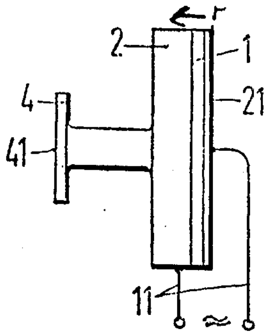
FIG. 1 is an elevational view of a piezoelectric oscillator system according to the present invention.

Referring to FIG. 1, a piezoelectric oscillator system is illustrated wherein a piezoelectric ceramic disc, polarized in the direction of its thickness, is provided as a piezoelectric transducer 1 glued to a metal plate 2 of a coupling oscillator, the metal being, for example, aluminum. The piezoelectric transducer 1 is provided with an electrode 21 and a pair of feed conductors 11 are attached to the electrode 21 and the plate 2 for receiving an energizing AC voltage for inducing via the transducer 1 bending vibrations of the plate 2. The vibrations of the plate 2 and transducer 1 are coupled by way of a coupling bridge 3 to a second, thinner plate 4, whose diameter is selected so that the resonant frequency of the plate 4 agrees with the resonant frequency of the plate 2. Based on the principles of maintaining the center of gravity, this system accomplishes the same that, under phase opposition vibration of both plates an amplitude relation is provided for the plates which is approximately inversely proportional to the relation of the mass of the two plates.

Figure 2:
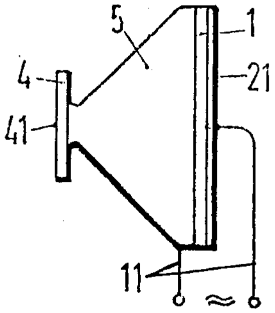
FIG. 2 is an elevational view of another piezoelectric oscillator system according to the present invention.

FIG. 2 illustrates, likewise in an elevational view, a preferred embodiment of a vibrator system according to the present invention which is somewhat similar to that illustrated in FIG. 1 and advantageously appropriate for use in the atomization of liquids. In FIG. 2, the piezoelectric transducer 1, polarized in the direction of its thickness, is again seen. An AC voltage is applied to the transducer 1 by means of the feed conductors 11. The plate 2 and coupling bridge 3 of FIG. 1 have been designed as a single frustum 5, and the plate 4 is fastened to the tip of the frustum, for example, at a point where atomization is to take place.

Figure 3:
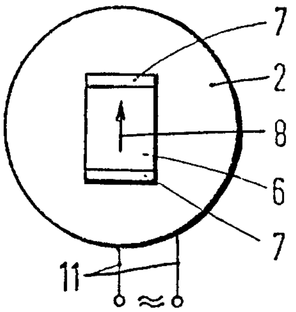
FIG. 3 is an end view of a piezoelectric oscillator system which can function as a voltage transformer.

FIG. 3 illustrates an embodiment of an oscillator system according to the present invention intended to be used as a voltage transformer. The plate 2 is secured to the transformer 1 (not visible in this Figure), and provided with an AC voltage feed at conductors 11. The output voltage is generated in a piezo ceramic element 6 designed as a platelet and pasted or glued to and covering the plate 4. The dimensions of the ceramic platelet are so selected that only bending vibrations occur, preferably in the direction of the longer edge of the platelet. Greater mechanical tensions occur in such an oscillation system in the element 6 due to the amplitude transformation. As a result of the polarization indicated by arrow 8, an electrical output voltage amounting to a multiple of the input voltage can be tapped at a pair of spaced-apart strip-like metal electrodes 7.

Figure 4:
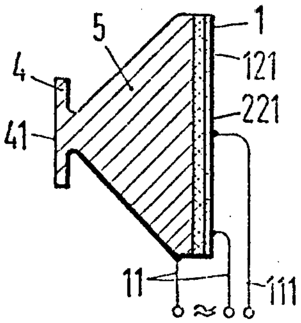
FIG. 4 is a sectional view of a piezoelectric oscillator system according to the invention having an additional tapping electrode for taking off a control voltage.

FIG. 4 illustrates an embodiment of the invention wherein the electrode 21 of FIGS. 1 and 2 is divided on the transducer 1 into two electrodes 121, 221. In the embodiment according to FIG. 4, the electrode 121 anularly surrounds the electrode 221. In place of the division of electrode 21 particularly shown in FIG. 4, other divisions may also be provided in an area-like manner, for example, a sectorial division. This division gives rise to a third electrode which may be employed as a tapping electrode for an electrical voltage, particularly for feedback purposes. An electrical feedback is provided for the energization of the oscillator system according to the invention in accordance with the principle of self-energization.

Self-energization of the oscillating system is particularly advantageous in those cases where, for example, the oscillator is applied in a system for atomizing fluids wherein the resonant frequency of the entire system changes more than can be tolerated for adequate stimulation, for example, due to heating during operation. Such frequency changes, however, also result due to the possibly changing load with respect to time of the surface intended for atomization of fluid and/or calcium deposits contained in water when water is the fluid. Due to the self-energization principle, it is possible, with feedback, to automatically attain in an oscillator system according to the present invention, a continuous optimal harmony between the resonant frequency of the system and the frequency of the stimulating AC voltage.

In order to avoid superheatings of the ceramic/or electric flashovers, particularly in the case of the atomization of water, it is important not to operate the oscillator system with excessively high electrical voltages, but to nonetheless achieve high mechanical performance.

It has been discovered that particularly high amplitudes of oscillations and/or a particularly high degree of effectiveness of an oscillator system according to the invention may be achieved by stimulating the transducer with a rectangular voltage, whose fundamental frequency substantially agrees with the bending resonant frequency of the system. It has proven advantageous to utilize a rectangular voltage which is generated according to the principle of self-energization for this system. To be specific, even higher inherent resonances of the oscillator system are stimulated by the harmonic content of the rectangular voltage, which harmonic content improves the atomizing effect.

Figure 5:
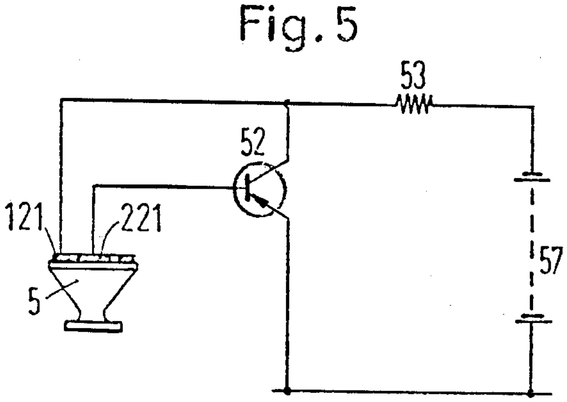
FIG. 5 is a schematic circuit diagram illustrating self-generation of the AC energizing voltage for a piezoelectric oscillator according to the present invention.

FIG. 5 is a schematic diagram which illustrates the self-energization principle. To stimulate the coupling vibrator in the basic resonant frequency of the bending vibration, it is provided that the direction of the permanent polarization in the ceramic of the transformer below the circular central electrode 221 is directed opposite to the direction of polarization in the ceramic below the annular electrode 121. The result of this opposite direction of polarization is that the feedback voltage at the electrode 221 is in phase opposition to the energizing voltage at the electrode 121. This feedback voltage is fed to the base of a transistor 52. By selecting the size of a charge resistance 53, a frequency selection can also be accomplished. The edges of the central electrode 221 and of the range of the ceramic located below it and polarized in the opposite direction are located efficiently at the point where the vibration node of the circuit occurs for the first harmonic of the bending oscillation of the coupling vibrator on the surface of the transducer 2 which carries the electrodes. This measure provides that substantially electric voltage is fed back only at the basic frequency of the bending oscillation of the coupling vibrator, which results in a good utilization of the available electric output. The battery 57 represents a suitable DC voltage source.

Figure 6:
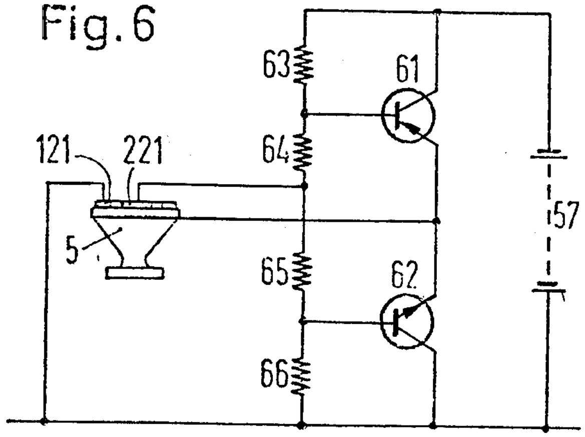
FIG. 6 is a circuit diagram of the piezoelectric oscillator system according to the present invention wherein an AC rectangular waveform is provided by means for effecting self-generation of the AC energization voltage of the oscillator system.

FIG. 6 illustrates a particularly preferred embodiment of the invention for a feedback circuit with means for providing self-energization of the oscillator system according to the invention, the energization preferably being effected by stimulation with a rectangular AC voltage waveform. As in the embodiment according to FIG. 5, the oscillation system is provided with a transducer having a ceramic element polarized across its thickness and in opposite directions for the respective electrodes 121, 221. The feedback voltage is fed from the electrode 221 by way of a voltage divider provided by a plurality of resistors 63, 66 to the base electrodes of a pair of transistors 61, 62 which are complementary to each other. Through a correspondingly high feedback, the transistors are overmodulated to an extent that they are alternately completely conductive or blocked with respect to one another. In this way, a rectangular voltage is generated which is supplied to the electrode 121.

Even high inherent resonant frequencies of the coupling oscillator, and thus of the entire oscillating system according to the invention, are stimulated in addition to the feedback stimulation of the basic resonant frequency of the bending oscillation of the coupling oscillator in this circuit due to the harmonic content of the rectangular wave. This stimulation can be realized in principle also with the circuit according to FIG. 5, if there is a corresponding overmodulation of the transistor 52.

The rectangular AC voltage to be employed for stimulation may also be fed in from an exterior source, for example, by application of a correspondingly distorted AC line voltage. For that purpose, the coupling oscillator and/or the oscillation system is synchronized so that its bending frequency agrees with the line frequency.

In the embodiments according to FIGS. 5 and 6, as in the other embodiments according to the invention, the plate 2 or the frustum of the coupling oscillator is the corresponding counter electrode to the electrodes 21 and/or 121 and 221. Normally this electrode is grounded.

Turning now to the piezoelectric devices per se, it is a particular feature of the invention that the two plates (1, 2, 21) and (4) are tuned to each other with respect to their bending frequency. This provides a most effective operation of the device. The respective bending frequency of a plate is determined by its diameter, thickness and the particular material utilized. Within certain limits, the same bending frequency can be obtained with a thin plate of smaller diameter as with a thicker plate of a larger diameter. Furthermore, the magnitude of the desired frequency plays an important role in dimensioning in individual applications. The dimensions of a plate must be smaller as the desired frequency becomes higher, since the bending frequency of a bending oscillation plate decreases with increases in its dimensions. In this connection, it should be pointed out that a linear relationship does not exist between the bending frequency and the dimensions of a bending plate (Bessel functions).

As far as a free selection of thickness and diameter of the plates for a given frequency, such dimensions are selected in accordance with the mechanical efficiency which is required by the oscillation system. A larger oscillation system must be selected for a higher efficiency than for a smaller efficiency.

It should also be noted that it must be taken into account that the coupling bridge 3 primarily serves for transmitting power from the plates 1, 2 and 21 to the plate 4. Its diameter or cross-section is greater when the power to be transferred is greater. Therefore, the length of the element 3 is not critical for practical applications. The element only influences the oscillation behavior of the plates to a very minor degree. Therefore, this element can be integrated into the plates, as illustrated in FIG. 2, in particular with the resulting shape of a frustum.

The frequency which is to be selected results from the particular application. With an embodiment according to FIG. 3, the bending frequency of the plates is determined by the voltage at the electrode 7. In the specific case of a liquid atomizing device, the given frequency is determined by the most effective frequency for atomization of the liquid. It depends, to a certain degree, in particular, on the surface tension of the respective liquid which can be relatively different, for example, between water and benzene. The favorable frequency for water atomization is in the order of approximately 100 kHz. This results in a largest diameter of the frustum 5 of 17 mm, for example, for an oscillation system of the embodiment according to FIG. 2. The height of the device is 14 mm, whereby 1 mm is accorded to the plate 4 and the ceramic 1. The most narrow portion of the device, in this example, has a diameter of approximately 6 mm, and the plate 4 has a diameter of 10 mm. Dimensions of approximately the same order will result for an embodiment according to FIG. 1, if it is employed in the atomization of water at the prescribed frequency of 100 kHz.

One skilled in the art will readily appreciate that in any case, optimum dimensions are dictated by the specific individual application of the oscillator.

Another essential relation relates to the amplitude transformation of the oscillator system, particularly that the plate 4 is thinner than the plate 2. This is also true for the corresponding elements of FIG. 2. This is evident from the foregoing discussion of dimensions of the plates with respect to bending frequency.

As set forth above, the plates 2 and 4 and the intermediate connecting bridge 3 can be designed as a single piece and can be produced by forming the total combined element from a single piece of material or by soldering or welding together separate pieces of material.

The plate 4 consists, for example, of a metal. Any metal or metal alloy can be utilized which has sufficient elasticity for oscillations.

The cross-piece 3 may, for example, also consist of metal, and the same is true for the plate 2.

In practicing the invention, however, one is not necessarily limited to a utilization of metal for the elements 2, 3 and 4. Certain other materials, for example, glass and ceramic, may be utilized.

Any bonding agent or glue can be employed which can withstand the tangential (shear) stress, as stated above. The glue is not particularly critical for the oscillation system according to the invention in that only tangential forces are encountered between the piezoelectric transducer 1 and the plate 2. In this respect, a glue sold under the mark CIBA AV 8 has been found to provide satisfactory performance.

Those skilled in the art will readily appreciate that there are several piezoelectric materials which may be utilized in practicing the present invention. However, certain materials, such as barium titanate and lead-zirconate-titanate are considered as being both practical and relatively inexpensive. Such materials are disclosed in U.S. Pat. Nos. 2,708,244 and 2,906,710.

The just-mentioned patents disclose, among other things, that silver may be applied for electrodes and that such electrodes may be attached, for example, by means of baking in a suspension which contains silver.

Although I have described my invention by reference to specific illustrative embodiments and particular dimensions, many changes and modifications of my invention may become apparent to those skilled in the art without departing from the spirit and scope thereof. I therefore intend to include within the patent warranted hereon all such changes and modifications as may reasonably and properly be included within the scope of my contribution to the art.

I claim:

1. A piezoelectric oscillator system for amplitude transformation in response to energization by an AC voltage, comprising: a rectangular first plate to be stimulated into bending vibration; a mechanical vibration connecting member including at least a portion thereof having a low cross-sectional area and connected to said first plate; and a coupling oscillator connected to said connecting member for receiving an AC voltage and effecting vibration of said first plate, said coupling oscillator comprising a second plate connected to said mechanical connecting member and a piezoelectric transducer fastened to said second plate, said transducer and said second plate each including an electrode for receiving the AC voltage, wherein said plates are dimensioned to vibrate at the same bending oscillation-frequency and at amplitudes related to the inverse ratio of their masses, said piezoelectric transducer including a piezoelectric element carried on said first plate, said element and said first plate tuned for vibrations in the direction of an edge of said first plate, said element being polarized and including output electrodes for taking off a voltage produced thereby in response to bending vibration.

2. The oscillator system according to claim 1, wherein said output electrodes are spaced-apart strip electrodes mounted on a surface of said piezoelectric element and said element is polarized in the direction between the electrodes.

3. The oscillator system according to claim 1, wherein said piezoelectric element is glued to said first plate.

4. A piezoelectric oscillator system for amplitude transformation in response to energization by an AC voltage, comprising: a first portion to be stimulated into bending vibrations; a second portion; an intermediate mechanical vibration connecting portion of which at least a section thereof has a low cross-sectional area, said intermediate mechanical vibration connecting portion connecting said first portion and said second portion, said vibration connecting portion and said second portion together forming a one-piece frustum-shaped member; a piezoelectric transducer fastened to said second portion, said transducer and said second portion each including an electrode for receiving an AC voltage, and said portions dimensioned to vibrate at the same bending oscillation frequency and at amplitudes related to the inverse ratio of their masses.

5. The oscillator system according to claim 4, wherein said piezoelectric transducer is polarized in the direction of its thickness.

6. The oscillator system according to claim 4, wherein said vibration mechanical connecting member and said second plate together form an integral frustum-shaped member.

7. The oscillator system according to claim 4, wherein said piezoelectric transducer is glued to said second plate.

8. The oscillator system according to claim 4, comprising another electrode carried on said piezoelectric transducer for taking off a voltage signal.

9. The oscillator system according to claim 8, comprising means for effecting self-generation of the AC voltage including an input terminal connected to said other electrode for receiving said signal and output means connected to the first-mentioned electrodes for delivering the AC voltage thereto in response to said voltage signal.

10. The oscillator system according to claim 9, wherein said means for effecting self-generation of the AC voltage comprises a transistor having a collector and an emitter respectively connected to the first-mentioned electrodes and a base connected to said other electrode.

11. The oscillator system according to claim 9, wherein said means for effecting self-generation of the AC voltage includes means for producing an AC rectangular voltage whose fundamental frequency substantially agrees with the mechanical resonant frequency of said plates.

12. The oscillator system according to claim 11, wherein said means for producing an AC rectangular voltage comprises a pair of complementary transistors each having a base, a collector and an emitter, the collector of one of said transistors connected to one of the first-mentioned electrodes, a DC voltage source, said collectors connected together via said DC voltage source, said emitters and the other of the first-mentioned electrodes connected together, a voltage divider connected across said collectors, said bases connected to said voltage divider, and said other electrode connected to said voltage divider to effect alternate conduction of said transistors.

* * * * *